(12) United States Patent
Muscatell (10) Patent No.: US 7,451,611 B2
(45) Date of Patent: Nov. 18, 2008

(54) SOLAR AIR CONDITIONING SYSTEM

(76) Inventor: Ralph Muscatell, 2007 NE. 20th Ave., Ft. Lauderdale, FL (US) 33305

( * ) Notice: Subject to any disclaimer, the term of this patent is extended or adjusted under 35 U.S.C. 154(b) by 0 days.

(21) Appl. No.: 11/671,547

(22) Filed: Feb. 6, 2007

(65) Prior Publication Data

US 2008/0092575 A1    Apr. 24, 2008

Related U.S. Application Data

(60) Provisional application No. 60/853,531, filed on Oct. 23, 2006.

(51) Int. Cl.
*F25B 27/00*    (2006.01)
(52) U.S. Cl. .................. 62/235.1; 62/238.6; 62/434
(58) Field of Classification Search ................ 62/235.1, 62/434–435, 238.6
See application file for complete search history.

(56) References Cited

U.S. PATENT DOCUMENTS

| | | | | |
|---|---|---|---|---|
| 1,969,187 A | * | 8/1934 | Schutt | 165/236 |
| 3,216,215 A | * | 11/1965 | Schuett | 62/185 |
| 4,064,705 A | * | 12/1977 | Edwards et al. | 62/149 |
| 4,270,359 A | * | 6/1981 | Hummel | 62/235.1 |
| 4,336,692 A | * | 6/1982 | Ecker et al. | 62/82 |
| 4,438,881 A | * | 3/1984 | Pendergrass | 237/2 B |
| 4,507,936 A | * | 4/1985 | Yoshino | 62/235.1 |
| 4,798,056 A | * | 1/1989 | Franklin | 62/235.1 |
| 5,177,977 A | * | 1/1993 | Larsen | 62/235.1 |
| 6,775,999 B2 | * | 8/2004 | Wilkinson | 62/235.1 |

* cited by examiner

*Primary Examiner*—William E Tapolcai
(74) *Attorney, Agent, or Firm*—Daniel S. Polley, P.A.

(57) ABSTRACT

A solar air-conditioning system that is preferably designed to operate with concentrated solar heat and uses a circulating refrigerant in a cycle of compression and expansion. Solar concentrators raise the temperature and pressure of the refrigerant. The raised temperature is dissipated to the atmosphere and the refrigerant proceeds to the evaporator coil, which is located within a water tank containing at least 1000 gallons of an anti-freeze water solution. As the water is the storage medium, heat can be added to or extracted from the storage medium by the evaporator coil. A radiator pickup coil is also located within the water tank and is part of a separate chilled water system which can circulate its own water supply through other radiators located throughout a dwelling. Additionally, one or more bypass valve(s) within the refrigerant system allow switching to solar heating.

22 Claims, 9 Drawing Sheets

SOLAR AIR CONDITIONING SYSTEM

This application claims the benefit of and priority to U.S. Application Ser. No. 60/853,531, filed Oct. 23, 2006, which is incorporated by reference in its entirety.

1. Field of the Invention

The present invention relates generally to air conditioning systems and particularly to a solar air conditioning system.

2. Background of the Invention

High electricity bills from air conditioning and/or heating use for a dwelling are common and reoccurring. Additionally, the manufacture of energy at a power plant causes pollution to be released in the air. Furthermore, electricity availability in undeveloped countries, as well as remote locations in developed countries, may be scarce, on limited basis or often non-existent. As a result, these locations are unable to store foods and liquids requiring refrigeration due to the lack of electricity. For undeveloped countries the lack of electricity is a factor in the poverty, hunger and lack of nourishment for its citizens. It is to these problems that the present invention is directed.

SUMMARY OF THE INVENTION

The present invention generally provide a solar air-conditioning system that is preferably designed to operate with concentrated solar heat supplemented with solar electric cells/battery and if necessary, power from an electric utility grid. The unit of heat added or subtracted is a British Thermal Unit ("BTU"), which is defined as the amount of heat to raise one pound of water one (1°) degree Fahrenheit. With excess capacity preferably designed in, unused BTUs can go into reserve for night and cloudy days. The present invention system can use a circulating refrigerant such as, but not limited to, Freon or ammonia in a cycle of compression and expansion. Solar concentrators can raise temperature and pressure of the refrigerant. The raised temperature can be dissipated to the atmosphere and the refrigerant proceeds to the evaporator coil. The evaporator can be located within a water tank containing an anti-freeze water solution. Preferably, the water tank contains at least approximately 1000 gallons of the anti-freeze water solution. The water is preferably the storage medium. Heat can be added to or extracted from the storage medium by the evaporator coil.

Preferably, also within the water tank can be a radiator type pickup coil. The pickup coil can be part of a separate chilled water system which can circulate its own water supply through radiators located throughout a building, dwelling, house, etc. (all collectively referred to as "dwelling"). The temperature within this separate system can be the temperature of the water within the tank by simple conduction.

The refrigerant system can include a supplemental compressor which can be electrically driven from one or more, and preferably a plurality or bank of, solar electric cells or the power grid. The refrigerant system can also include one way direction positive displacement rotary valves which can serve to insure proper gas direction and can also provide a mechanical link to the energy in the refrigerant circuit. This mechanical link can be used to power a generator or a fluid pump. When in solar heat mode, certain bypass valves within the refrigerant system allow switching to solar heating. When in this mode the generator may be electrically switched to function as a motor to assist the circulation of the refrigerant.

The present invention can also be used for or applicable to large area coolers or refrigerators and provides a device which can provide refrigeration to areas where electricity is not present or available.

DETAILED DESCRIPTION OF THE PREFERRED EMBODIMENT

Figure 1:
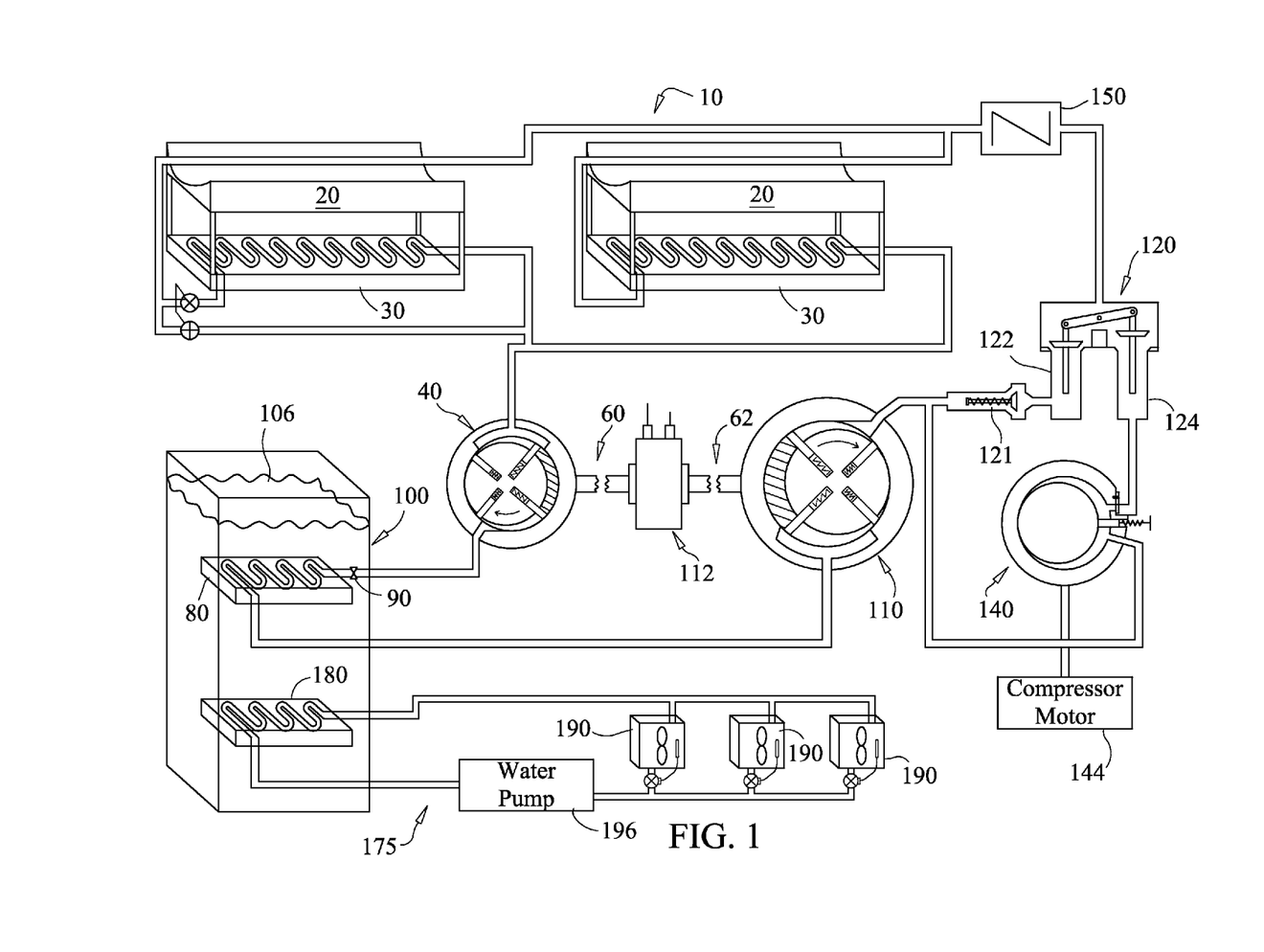
FIG. 1 is a schematic/flow diagram of a first embodiment for the present invention system.

As seen best in FIG. 1 a solar air-conditioning system is illustrated and generally referenced as system 10. System 10 includes one or more solar concentrators 20 and preferably a plurality of concentrators 20 preferably arranged in a parallel configuration or communication with each other. Concentrator(s) 20 capture energy from the sun raising the temperature and pressure of the refrigerant within the pipe, tubing, plumbing, conduits, hoses, etc. (all collectively referred to as "pipe" or "piping") at the focal point. Though not considered limiting, the refrigerant can be Freon or ammonia gas. All of the pipe, valves, components, etc. of the present invention are preferably connected to each other through conventional connectors, fasteners, etc.

The refrigerant within the pipe proceeds or otherwise travels to the one or more heat dissipaters, commonly known as condensers 30, which can be large area condensers. The number of condensers 30 can correspond to the number of concentrators provided for system 10. Condensers 30 dissipate heat from the heated refrigerant to the atmosphere. In one embodiment, condenser 30 can be approximately the size of its corresponding concentrator 20 in length and width and affixed to concentrator 20 with a spacing measurement between concentrator 20 and condenser 30 preferably within twelve (12") inches of each other. However such spacing measurement is not considered limited to within twelve (12") inches and other values can be used and are considered within the scope of the invention.

Figure 3:
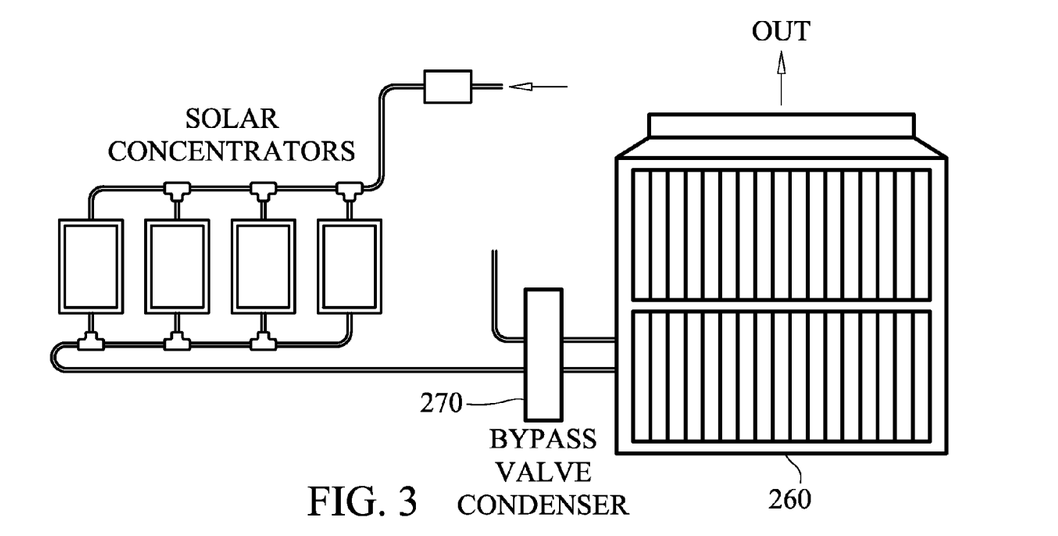
FIG. 3 is schematic/flow diagram of a portion of a third embodiment for the present invention system.

In an alternative embodiment, condenser 30 can be a single stand alone unit, which can include an electrically driven fan similar to conventional condensers. Thus, FIG. 1 illustrates multiple condensers, whereas FIG. 3 illustrates a single condenser coil 260.

After leaving condenser(s) 30, the refrigerant proceeds through a one direction valve 40. In a preferred embodiment, the one direction valve can be a "high side" positive displacement one direction rotary valve. Valve 40 assures that the refrigerant proceeds in the proper direction through the refrigerant circuit. As shown in FIG. 1, in one embodiment, a plurality of vanes are provided within the valve housing to move the refrigerant (a portion of the refrigerant within the valve is shown in shading/hatched lines between two of the vanes). Valve 40 can also provide a mechanical link 60 to the energy produced by the moving refrigerant. The mechanical link can be used to drive a generator, water circulation pump and/or other device.

Figure 5:
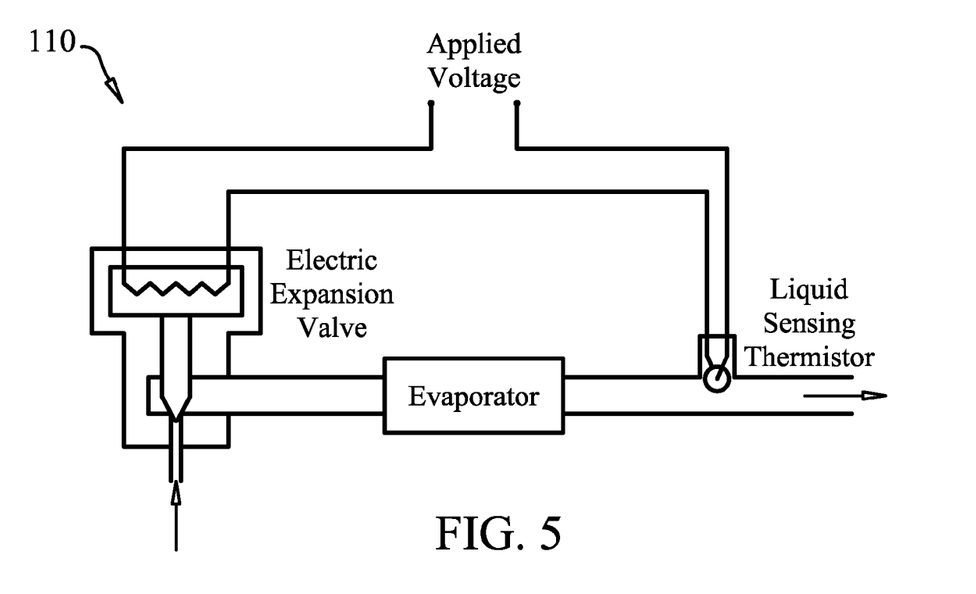
FIG. 5 is a schematic of a first embodiment for an expansion valve that can be used in accordance with the present invention system.
Figure 6:
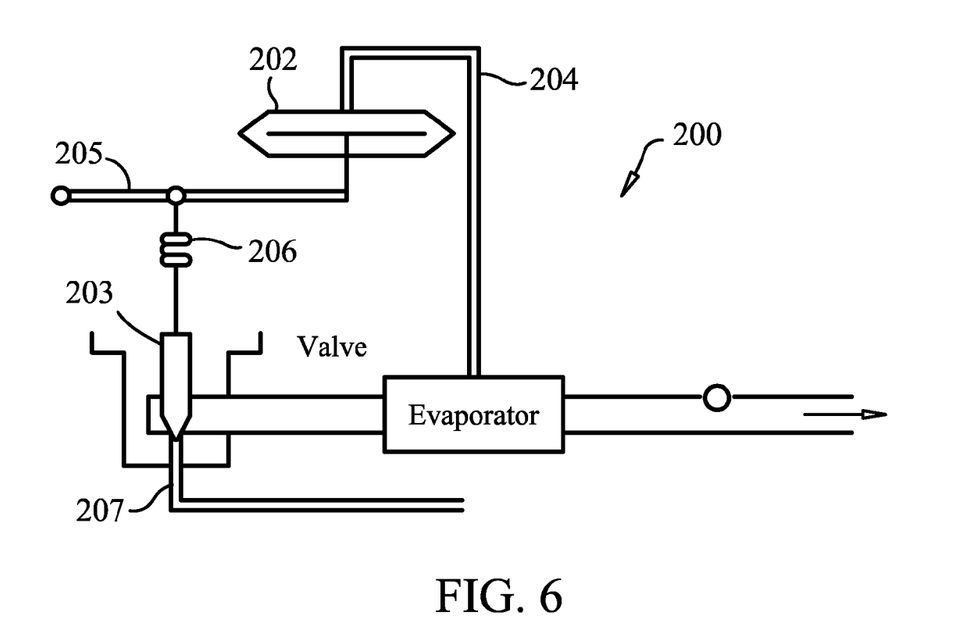
FIG. 6 is a schematic of a second embodiment for the expansion valve in accordance with the present invention system.
Figure 7:
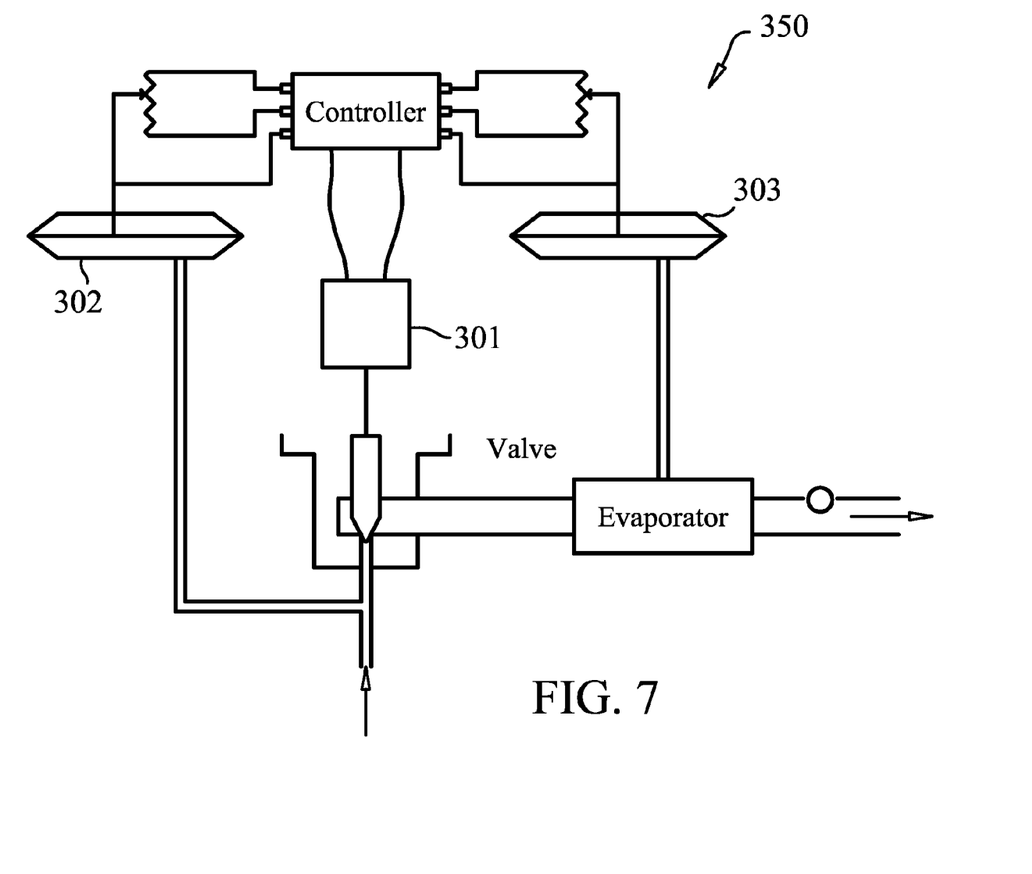
FIG. 7 is a schematic of a third embodiment for the expansion valve in accordance with the present invention system.

From valve 40, the refrigerant travels to an evaporator 80 which is preferably fitted with an expansion valve 90. In the preferred embodiment, expansion valve 90 can be an electronically controlled valve, though such is not considered limiting. FIGS. 5 through 7 provides further details on various non-limiting expansion valve embodiments that can be used with the present invention system or circuit.

Valve 90 is controlled based on the pressures contained within the refrigerant circuit which can vary as the solar energy varies. The expanding refrigerant within evaporator 80 removes the heat from the coil and medium surrounding evaporator 80. Preferably, evaporator 80 can be disposed within a water tank 100. Water tank 100 is preferably large enough in size to hold a large amount of a liquid, such as, but not limited to, approximately two thousand (2000) gallons of the liquid. However, other size water tanks can be used and are considered within the scope of the invention.

Preferably, the liquid 106 contained within water tank 100 can be a mixture of water and anti-freeze. Preferably, water tank 100 can be insulated, such as, but not limited to, burying water tank 100 beneath ground level. Additionally, water tank 100 can be greater in height than width to operate co-operatively with temperature stratification. As such, heat can be removed from many gallons of water, which a non-limiting example is shown by the following factoid using a non-limiting 2000 gallon water tank 100:

British Thermal Unit ("BTU"). 1 BTU=1 pound of water 1° F.

Water=8 pounds per gallon; 1 cubic foot=7.48 gallons=60 pounds of water.

134 cubic feet–8018 pounds of water.

Non-limiting Tank 100 dimensions: 4.2 ft×8 ft×8 ft=269 cu. ft=2000 gallons 2000 gallons=16,000 pounds=16,000 BTU per degree Fahrenheit.

32° F. to 12° F.=20° F.

20° F.×16,000 BTU=320,000 BTU 320,000 BTU/20,000 BTU hour=16 hours reserve.

Solar Power:

200 BTU/square foot/hour around solar noon.

20,000 BTU's per 100 square feet 40,000 BTU's per 200 square feet

Non-limiting Solar Concentrator 20 dimensions: each 2 ft.×10 ft.=20 square ft 10 units=200 square ft=40,000 BTU/hour The refrigerant exits from evaporator 80 and is directed to a second one directional valve 110, which again can be a positive displacement one direction rotary valve. Valve 110 can have a larger positive displacement chamber as compared to valve 40 since it may be working with lower pressures, and thus in the preferred embodiment, can be considered a low pressure valve. Valve 110 can also have a mechanical link 62 and can be (though not required) mechanically linked with valve 40, as illustrated in FIG. 1. By linking valves 40 and 110 together, stability can be provided to the refrigerant circuit. Furthermore, the rotation of valves 40 and 110 can derive rotational mechanical energy which can be utilized to drive a generator, water circulation pump, etc. and is illustrated with a generator or water pump 112. The vanes of valves 40 and 110 can be spring loaded.

The refrigerant then is directed from valve 110 to a preferably commonly connected balancing valve 120 and/or as an inlet to compressor 140. System balancing valve 120 can have a first inlet valve 122 which can constitute the primary circuit for the refrigerant and a second inlet valve 124 which is in communication with the outlet of compressor 140. Refrigerant travels through balancing valve 120 to one direction or one-way valve 150 where it proceeds to solar concentrator(s) 20 to restart the cycle.

Compressor 140 can be driven by a conventional compressor motor 144. Thus, when there is insufficient solar energy (cloudy day, etc.), system 10 (such as through one or more sensors provided in the circuit) can sense or otherwise determine to activate motor 144 to electrically drive compressor 140. In one non-limiting example, a temperature sensor can be disposed within the water tank for determining when to turn motor 144 on. Additionally, pressure sensors or other devices can also be used for this purpose. Pressurized refrigerant from compressor 140 can proceed through second inlet valve 124 on the balancing valve to one direction valve 150. Where a temperature sensor is provided within water tank 100, compressor 140 can be activated at predetermine temperatures through its connection to a conventional switcher (not shown in FIG. 1 but can be similar to the switch control shown in FIG. 2). In one non-limiting example, the predetermined temperature can be anywhere in the range of about 32° F. to about 12° F. However, other temperature values can be used and are considered within the scope of the invention.

Balancing valve 120 can be constructed such that there is linkage between first inlet valve 122 and second inlet valve 124. Thus, first inlet valve 122 can be closed, when the force of the pressurized refrigerant from compressor 140 opens second inlet valve 124. Similarly, when first inlet valve 122 is opened through receipt of refrigerant from valve 110, second inlet valve 124 can be closed. It is also possible and within the scope of the invention that both first inlet valve 122 and second inlet valve 124 are partially opened at the same time and the refrigerant traveling through both inlet valves (122 and 124) merges or combines and enters a single outlet which serves as the inlet to one way valve 150.

As seen in FIG. 1, water tank 100 also contains a pickup radiator 180 acting as heat exchange coil which functions as part of a separate chilled (or heated) water system 175 of air-conditioning (heat) for withdrawing (or adding) heat from (or to) a dwelling or structure through one or more radiators 190. Pickup radiator 180 in water tank 100 and one more radiators 190 disposed throughout the dwelling can circulate anti-freeze/water by way of a pump 196, which can be electrically or mechanically driven. The circulation of the water allows heat to be removed from or added to (as desired) from the dwelling. The chilled (heated) liquid or water system in the preferred embodiment is separate and isolated from the storage medium liquid or water. One skilled in the art would include a control, such as a thermostatic control, at each dwelling coil controlling the cold water flow such that the freezing point is not attained in these coils.

The present invention system can also be converted or otherwise switch from solar air conditioner to solar heating.

Figure 2:
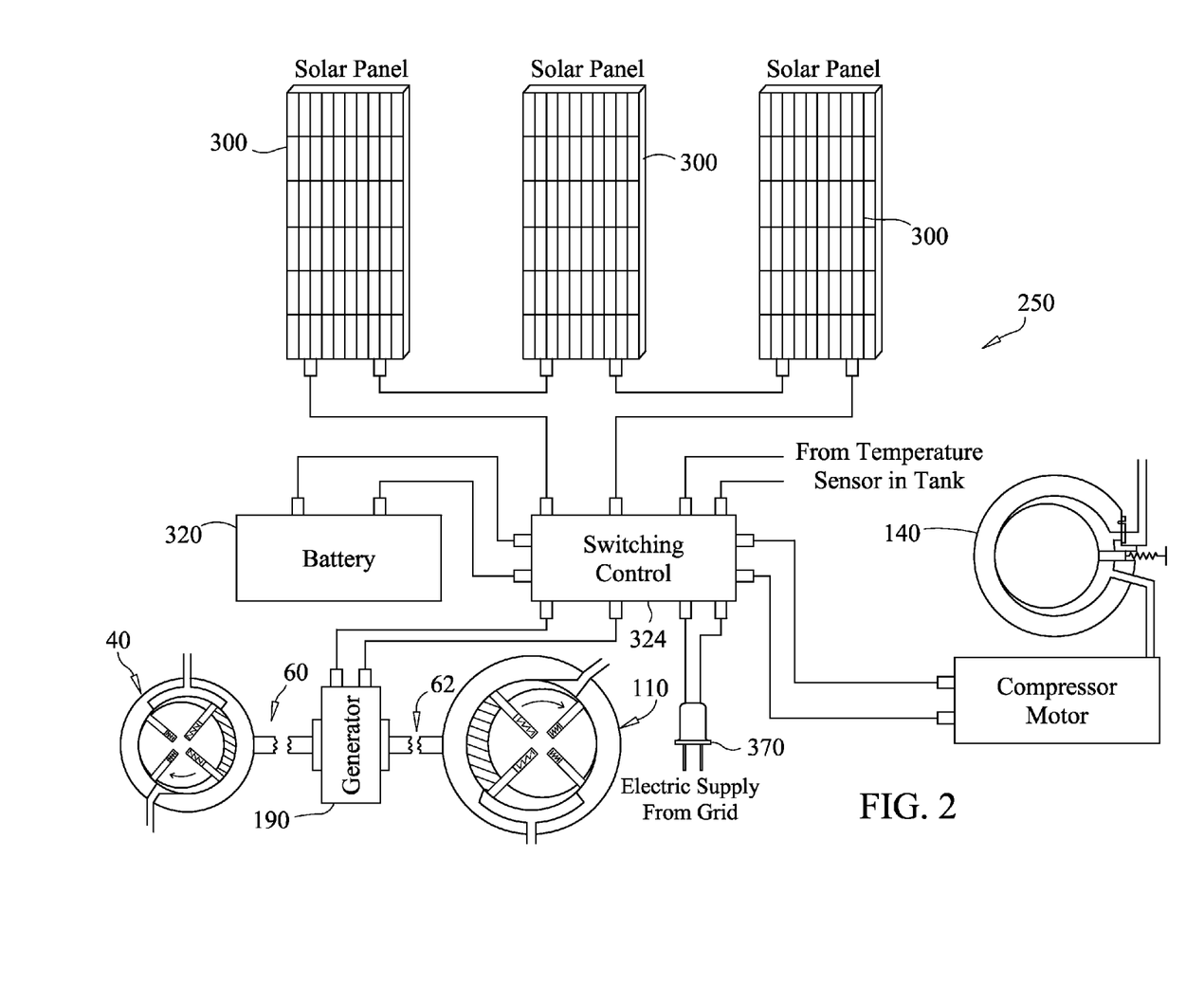
FIG. 2 is schematic/flow diagram of a portion of a second embodiment for the present invention system.

As seen in FIG. 2, system 250, which can contain similar not shown components as system 10, where a stand-alone (single) condenser 260 (FIG. 3) is used a bypass valve 270 (with associated pipe) can be provided at condenser 260. It should be recognized that multiple condensers, such as shown in FIG. 1, can also be used and each condenser can be provided with a bypass valve and associated pipe. By opening or otherwise engaging bypass valve 270 and electrically withdrawing the controlling element of the electronic expansion valve 90, the solar heated refrigerant is allowed to circulate through evaporator 80, which heats the water or mixture in water tank 100 by conduction. Generator 190, which can be commonly connected to rotary valves 40 and/or 110 can be electrically switched to function as a motor. The motor can drive rotary valves 40 and/or 110 to assure circulation of the heated refrigerant through the refrigerant circuit.

Figure 4:
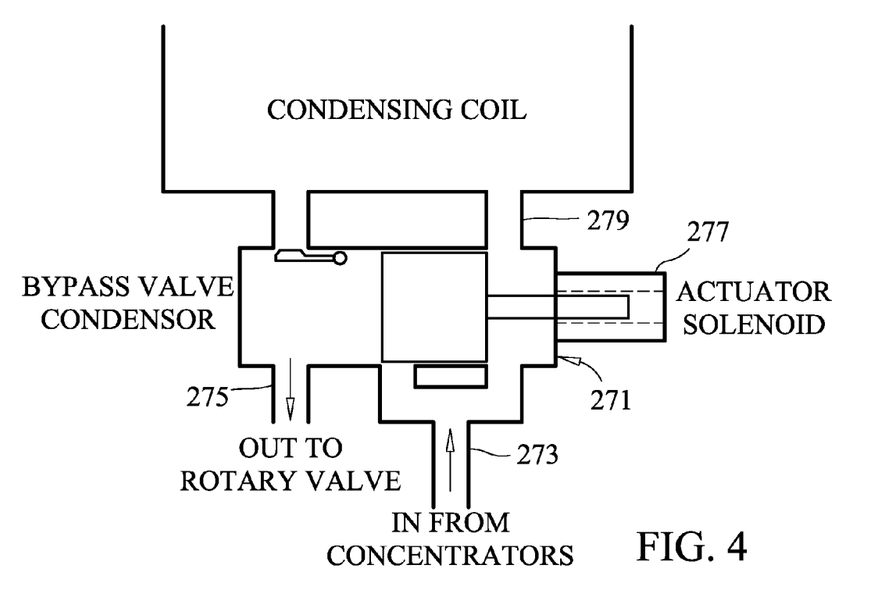
FIG. 4 is a detailed view of one bypass valve (which is used when switching to solar heat mode) that can be used in accordance with the present invention system.

Bypass valve 270 is shown in more detail in FIG. 4. A housing 271 with inlet port 273 and outlet port 275 is shown. Actuator solenoid 277 controlling a piston 279 dictates the travel route of the refrigerant by opening or closing appropriate ports depending if the system is being used for air conditioning or for heating purposes. However, other types of bypass valves can be used with the present invention system or circuit and are also considered within the scope of the invention.

As the heat of the refrigerant has not been dissipated through a condenser, the refrigerant warms water or mixture in tank 100, which in turn causes the liquid/water in pickup radiator 180 to be heated and then dispersed through system 175 by pump 196 as described above.

As seen in FIG. 2, the present invention system can also be complemented with solar electric panels 300 and battery 320. Electricity derived from this sub-system can drive compressor 140. The energy from concentrator(s) 20 and the solar electric can compliment each other to drive the refrigerant within the circuit. Additionally, at times of insufficient solar energy or battery energy, power from a utility grid 370 can supply the energy to drive compressor 140. A switching control 324 can be provided for managing or controlling the various energy sources. Thus, the various components help to drive compressor 140 when needed, which can be considered, though not required, a supplement mode of energy.

It should be recognized that various combinations of concentrator(s), utility grid (conventional electricity), battery(ies), solar panel(s), etc. can be used and all combinations are considered within the scope of the invention. Thus, as non-limiting examples, the complimentary system does not necessarily preclude (1) a system which operates solely on energy from solar concentrators, excluding solar electric; or (2) a system which operates solely on solar electric panels, excluding solar concentrators. Again, the above-described energy sources can be used in various combinations or by themselves and all variations are considered within the scope of the invention.

FIGS. 5 through 7 illustrate several embodiments for the expansion valve component of the present invention. The primary function of the expansion valve is to meter pressurized gas (high side) into the evaporator (low side) allowing expansion of the gas and corresponding heat absorption. Conventional expansion valves operate with a constant known pressure. However, with the present invention system it is preferred that the expansion valve operate over a range of pressures as solar energy will vary. Thus, different types of novel designs for the expansion valve can be used and incorporated into the present invention system where the expansion valve can be controlled according to pressures on the high side and on the low side within the refrigerant circuit.

As seen in FIG. 5, an expansion valve 110 is shown and can be controlled by sensing refrigerant which has been compressed to a liquid state, and acting at that point to control the expansion valve to open slightly to allow a greater flow and thus reducing the pressure in the evaporator.

As seen in FIG. 6, an expansion valve 200 is shown and can have a pressure sensing diaphragm 202 connected to a control element 203 of expansion valve 200. The active chamber of the diaphragm 202 can be connected to evaporator 80, such as, but not limited to, through a suitable conduit (i.e. pipe 204). Diaphragm 202 can be connected to control element 203 through a leverage bar 205 and a spring 206. Spring 206 has increasing tension with compression. In operation, as gas pressure in the high side 207 of the refrigerant circuit rises, valve control element 203 is raised and thus overcoming the spring tension and allowing passage of the refrigerant. As pressures begin to rise in the evaporator, diaphragm 202 moves to close control element 203 and thus blocks or limits passage of the refrigerant. As such, control element 203 meters the flow of gas according to the pressure in the evaporator. With even higher pressures diaphragm 202 limit will be reached and spring tension will maintain the restrictive pressure on valve control element 203. Spring 206 can be gradually increasing pressure with compression.

As seen in FIG. 7, an expansion valve 350 is shown and controls its control element 203 through the use of an electrically drive linear motor 301. Control of valve element 203 is again according to pressures within the refrigerant circuit and particularly on the high side before expansion valve 300 and after the valve within evaporator 80. Valve 300 can include an electrical potentiometer combined with a mechanical pressure sensor and is shown in FIG. 7 as a pressure diaphragm 302 with associated potentiometer 303. As the circuit of FIG. 7 reacts to changing pressure the wiper/arrow moves along the resistive element of the potentiometer to vary the resistance.

Though in the preferred embodiment the chilled water system can be an isolated closed system with a pickup coil in the water tank, such is not considered limiting. It is also within the scope of the invention to have the present invention operate with no pickup coil within the tank. Such an alternative version could operate circulating the storage medium water within the water through the in-dwelling radiators.

Figures 9, 10, 11:
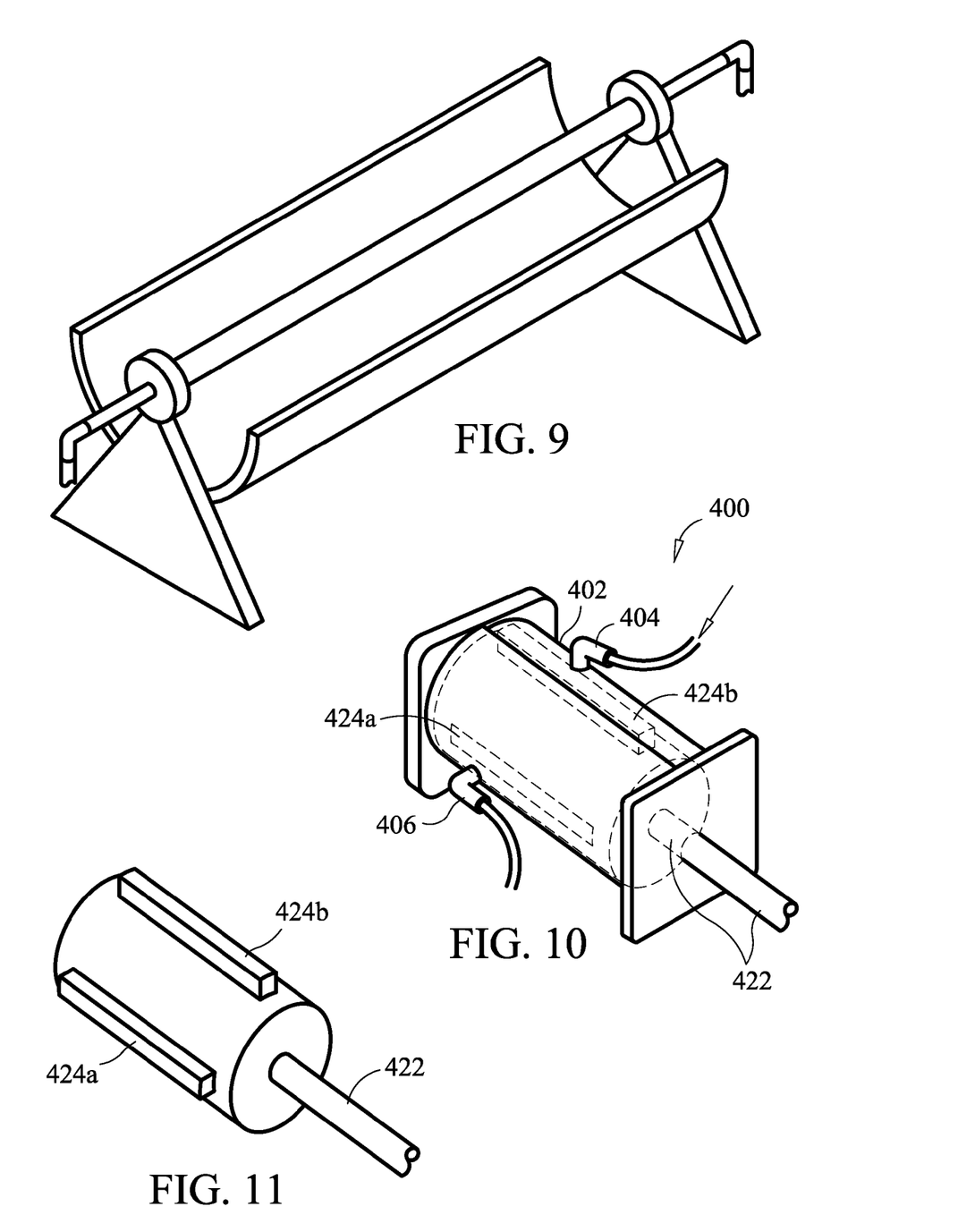
FIG. 9 is a perspective view of a solar concentrator which can be used with the present invention system.
FIG. 10 is a perspective view of rotary valve that can be used with the present invention system.
FIG. 11 is a perspective view of the inner cylinder for the rotary valve of FIG. 10.

FIGS. 10 and 11 illustrates a rotary value 400 that can be used with the present invention system as such as value 40 and/or value 110 shown in FIG. 1. Value 400 comprises an outer cylindrical value body housing 402 having an inlet port 404 and an outlet port 406. Preferably, outlet port 406 can be preferably at least one-hundred (100°) degrees in direction of rotation from inlet port 404 in a four (4) vane configuration and correspondingly so with multiple vanes. An inner rotational cylinder 420 is dlsoosed within housing 402 and can ne supported by a center longitudinal shaft 422 offset from the center of outer housing 402. A plurality of vanes 424 (preferably spring loaded) are fitted into cylinder 420. Vanes 424 are disposed along the longitudinal axis of cylinder 420 and preferably equally spaced from each other around the circumference of cylinder 420. As seen in the FIG. 10, inner cylinder support shaft 422 can extend beyond valve housing 402 such that external appliances can be attached thereto. A portion of cylinder 420 is flush against the inner wall of housing 402 such that vane 424a is fully compressed. As a gap is created between the portion of cylinder 420 associated with vane 424b and housing 402. vane 424b protrudes outward from cylinder 420, in view of its preferred spring loaded configuration.

Fundamental to the "refrigeration" or "heat pump" cycle is a dissipation of the heat of compression. This is usually accomplished by circulating the compressed refrigerant gas through a finned coil exposed to the atmosphere (i.e. a condenser coil). It may be a large area condenser to dissipate heat by simple conduction (FIG. 1, #30) or it may be smaller and compact with fan forced air circulation (FIG. 3).

Figure 8:
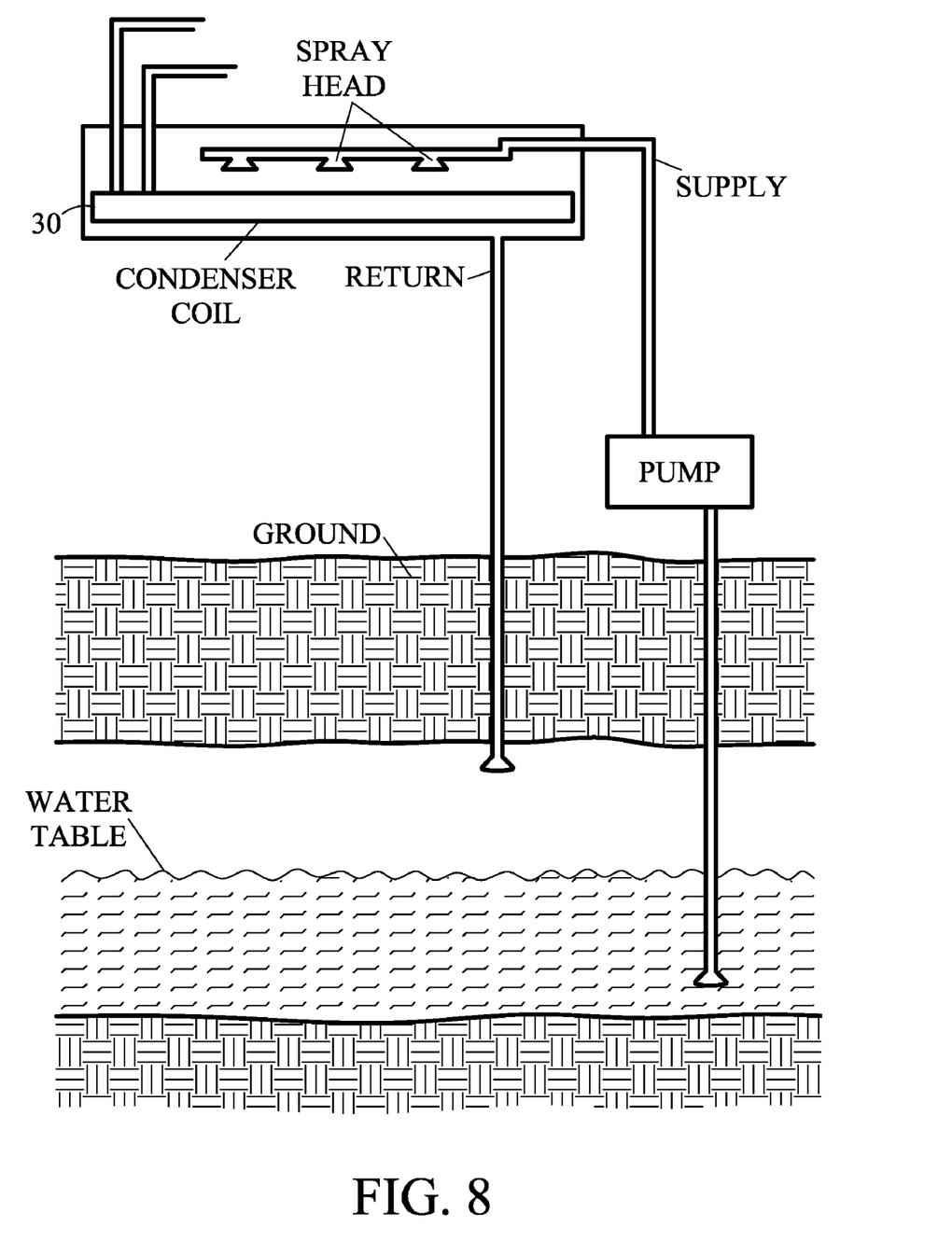
FIG. 8 is a diagram for allowing a condenser coil of the present invention system to dissipate heat to water circulated over its surface.

Another embodiment or method that can be used with the present invention system is illustrated in FIG. 8. In this method, condenser coil 30 may dissipate heat to water circulated over its surface. The water can be drawn by a pump from an underground water table. The underground water temperature can be approximately twenty-five (25°F.) degrees Fahrenheit cooler than the atmosphere. Other degree differences can also be selected and are considered within the scope of the invention. Thus, the efficiency of the heat dissipation and of the overall cooling is enhanced. This method might circulate water from the water table. Alternatively, water can be sprayed as a mist onto the condenser in its own external evaporation cycle of liquid to gas.

It should be recognized that other concentrators can be used with the present invention system and all are considered within the scope of the invention. Certain examples of concentrators are generally shown in the Figures but are not considered to limit the types of concentrators that can be used and incorporated into the present invention system.

Figure 12:
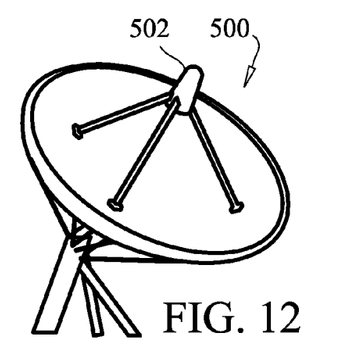
FIGS. 12 through 16 illustrated alternative concentrators that can be used with the present invention system.
Figure 13:
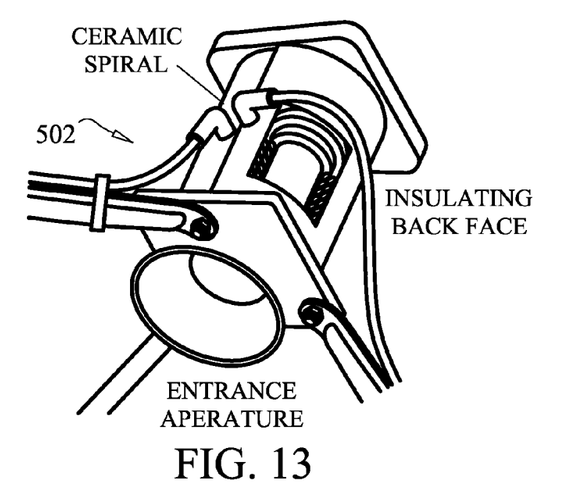
Figure 14:
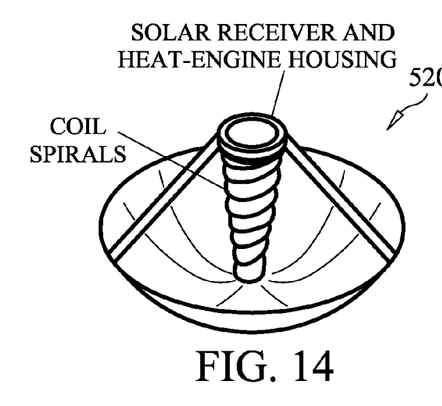
Figure 15:
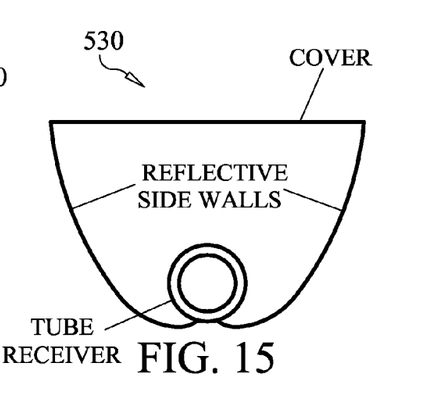
Figure 16:
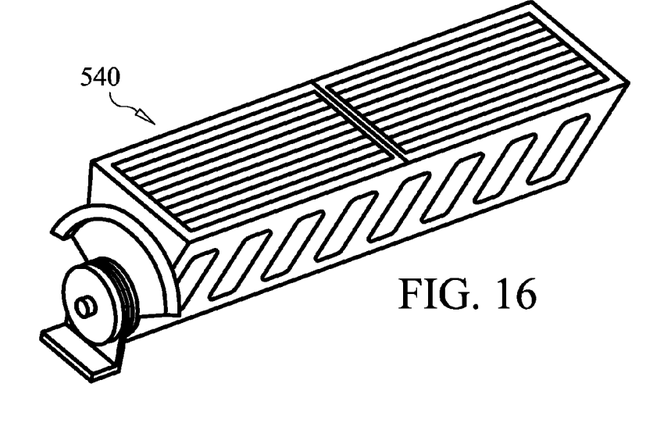
Figure 17:
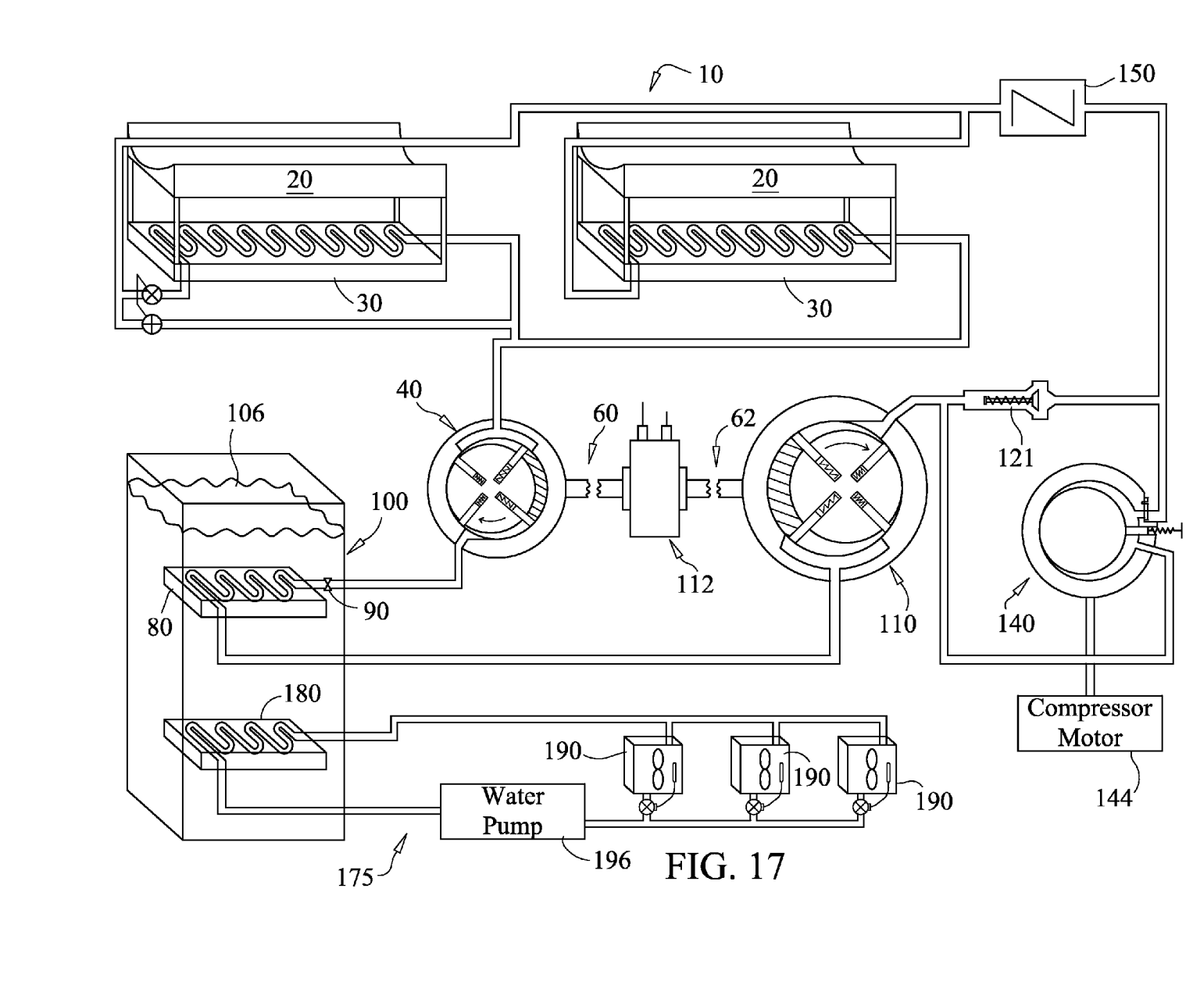
FIG. 17 illustrates a schematic/flow diagram of another embodiment for the present invention system.

FIG. 12 is a perspective view of a dish concentrator 500 that can be used with the present invention system. FIG. 13 is a partial cutaway perspective view of a ceramic coil pickup unit 502 of dish concentrator 500 illustrating the internal ceramic spiral coil. FIG. 14 is a perspective view of a solar receiver and heat-engine housing collectively referenced at numeral 520. FIG. 15 illustrated a parabolic trough concentrator 530 and FIG. 16 illustrates a Fresnel lens concentrator 540.

The above-described systems of the present invention can also be used for or applicable to large area coolers or refrigerators and provides a device which can provide refrigeration to areas where electricity is not present or available.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modifications disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A solar air-conditioning system, comprising
(i) a refrigerant circuit comprising:
one or more solar heat concentrators;
one or more heat dissipaters in communication with said one or more solar heat concentrators;
a first rotational multi vane positive displacement valve having an inlet in communication with said one or more heat dissipaters;
an evaporator having an evaporator coil, said evaporator having an inlet in communication with an outlet of the first rotational multi vane positive displacement valve and having an outlet;
a second rotational multi vane positive displacement valve having an inlet in communication with said evaporator and having an outlet in communication with said one or more solar heat concentrators;
(ii) a refrigerant disposed within and circulating through said refrigerant circuit;
(iii) a tank storing an amount of chilled liquid when said one or more heat dissipaters are in use, said evaporator located within the tank; and
(iv) a chilled water system comprising:
a pickup radiator having a radiator coil located within the tank;
a fluid pump in communication with said radiator;
one or more radiators dispersed through out a dwelling, each radiator having an inlet in communication with said liquid pump and each radiator having an outlet in communication with said pickup radiator; and
a liquid disposed within said chilled water system.

2. A solar air-conditioning system, comprising
(i) a refrigerant circuit comprising: one or more solar heat concentrators;
one or more heat dissipaters in communication with said one or more solar heat concentrators;
an evaporator having an evaporator coil, said evaporator having an inlet in communication with the one or more heat dissipaters and having an outlet in communication with said one or more solar heat concentrators;
a balancing valve having a first inlet in communication with the evaporator outlet, a second inlet and an outlet, said balancing valve outlet in communication with said one or more solar heat concentrators;
a compressor having an inlet in communication with the evaporator outlet and having a compressor outlet in communication with the second inlet of the balancing valve; and
a motor for driving the compressor;
(ii) a refrigerant disposed within and circulating through said refrigerant circuit;
(iii) a tank storing an amount of liquid, said evaporator located within the tank; and
(iv) a chilled water system comprising:
a pickup radiator having a radiator coil located within the tank;
a fluid pump in communication with said radiator;
one or more radiators dispersed through out a dwelling, each radiator having an inlet in communication with said liquid pump and each radiator having an outlet in communication with said pickup radiator; and
a liquid disposed within said chilled water system.

3. The solar air-conditioning system of claim 1 wherein said liquid contained within said tank is a mixture of water and an anti-freeze solution with said liquid ranging below the freezing point of water.

4. The solar air-conditioning system of claim 1 wherein said tank is insulated to lessen energy losses by conduction to an outside environment.

5. The solar air-conditioning system of claim 1 wherein said tank is buried underground.

6. The solar air-conditioning system of claim 2 wherein said refrigerant circuit further comprising a first one-way valve disposed between said one or more heat dissipaters and said evaporator.

7. The solar air-conditioning system of claim 6 wherein said first one-way valve is a positive displacement one way rotary valve.

8. The solar air-conditioning system of claim 2 further comprising means for powering said motor.

9. The solar air-conditioning system of claim 8 wherein said means for powering is one or more solar electric panels in communication with said motor.

10. The solar air-conditioning system of claim 1 wherein said refrigerant circuit further comprising an expansion valve at the inlet of the evaporator.

11. The solar air-conditioning system of claim 10 wherein said expansion valve is an electronically controlled expansion valve which provides unrestricted refrigerant flow in a solar heat mode.

12. The solar air conditioning system of claim 1 wherein said one or more heat dissipaters is a single condenser coil.

13. The solar air conditioning system of claim 7 wherein said refrigerant circuit further comprising a second one-way rotary positive displacement valve disposed between said evaporator and said balancing valve.

14. The solar air conditioning system of claim 13 wherein said first one-way valve and said second one way valve are mechanically linked to each other.

15. The solar air conditioning system of claim 13 wherein both said first one-way valve and said second one-way valve are rotary valves, and either or both of said first one-way valve and said second one-way valve are mechanically linked to a generator or fluid pump.

16. The solar air conditioning system of claim 2 wherein said refrigerant circuit further comprising a third one way valve disposed between said balancing valve and said one or more solar heat concentrators.

17. A solar air-conditioning system, comprising
(i) a refrigerant circuit comprising:
one or more solar heat concentrators;
one or more heat dissipaters in communication with said one or more solar heat concentrators;
an evaporator having an evaporator coil, said evaporator having an inlet in communication with the one or more heat dissipaters and having an outlet in communication with said one or more solar heat concentrators; and
a bypass valve used in conjunction with a controllable expansion valve disposed the inlet of said evaporator, said bypass valve disposed between said one or more solar heat concentrators and said one or more heat dissipaters;
wherein when using in solar heat mode said bypass valve in conjunction with the controllable expansion valve causes the refrigerant to not give up its heat to the atmosphere;
(ii) a refrigerant disposed within and circulating through said refrigerant circuit;
(iii) a tank storing an amount of liquid, said evaporator located within the tank; and
(iv) a chilled water system comprising:
a pickup radiator having a radiator coil located within the tank;
a fluid pump in communication with said radiator;
one or more radiators dispersed through out a dwelling, each radiator having an inlet in communication with said liquid pump and each radiator having an outlet in communication with said pickup radiator; and
a liquid disposed within said chilled water system.

18. A solar air-conditioning/heating system, comprising
(i) a refrigerant circuit comprising:
one or more solar heat concentrators;
one or more heat dissipaters in communication said one or more solar heat concentrators;
a first one-way rotary valve in communication with said one or more heat dissipaters;
an evaporator having an evaporator coil in communication with the first one-way valve;
an expansion valve at the inlet of the evaporator;
a second one-way rotary valve in communication with said evaporator;
a balancing valve having a first inlet in communication with the second one-way valve, a second inlet and an outlet, said balancing valve outlet in communication with said one or more solar heat concentrators; and
a compressor having an inlet in communication with the evaporator outlet and having a compressor outlet in communication with the second inlet of the balancing valve;
(ii) a refrigerant disposed within and circulating through said refrigerant circuit;
(iii) an insulated tank storing at least approximately 1000 gallons of a liquid, said evaporator located within the tank;
(iv) a motor for driving the compressor; and
(v) a chilled water system comprising:
a pickup radiator having a radiator coil located within the tank;
a fluid pump in communication with said radiator;
one or more radiators dispersed throughout a dwelling, each radiator having an inlet in communication with said liquid pump and each radiator having an outlet in communication with said pickup radiator, each of said radiators fitted with a thermostatic control valve; and
a liquid, having an anti-freeze component, disposed within said chilled water system;
wherein said expansion valve is controllable and provides unrestricted refrigerant flow in a solar heat mode.

19. The solar air conditioning system of claim 18 wherein said first one-way rotary valve and said second one-way rotary valve are mechanically linked to each other.

20. The solar air conditioning system of claim 18 wherein either or both of said first one-way rotary valve and said second one-way rotary valve are mechanically linked to a generator or fluid pump.

21. The solar air conditioning system of claim 18 wherein said refrigerant circuit further comprising a third one way valve disposed between said balancing valve and said one or more solar heat concentrators.

22. The solar air conditioning system of claim 1 wherein said refrigerant circuit further comprising a bypass valve disposed between said one or more solar heat concentrators and said one or more heat dissipaters, said bypass valve in communication with said first one-way rotary valve and when in use and in conjunction with a controllable expansion valve causing the liquid stored in the tank not to be chilled.

* * * * *